United States Patent Office 3,594,402
Patented July 20, 1971

3,594,402
TETRAACETONITRILOLITHIUMHEXAFLUORO-PHOSPHATE AND METHOD FOR THE PREPARATION THEREOF
Robert A. Wiesboeck, Atlanta, Ga., assignor to United States Steel Corporation
No Drawing. Filed May 29, 1969, Ser. No. 829,111
Int. Cl. C07c *12/28*
U.S. Cl. 260—465.8        4 Claims

ABSTRACT OF THE DISCLOSURE

Tetraacetonitrilolithiumhexafluorophosphate, a new compound prepared by reacting lithium fluoride and $PF_5$ or previously prepared $LiPF_6$ with excess $CH_3CN$, is disclosed. Tetraacetonitrilolithiumhexafluorophosphate is useful for the production of high purity exceptionally active $LiPF_6$ which is also a new composition of matter. The preparations of these new compositions are also disclosed.

BACKGROUND OF THE INVENTION

The invention relates to lithium compounds and more particularly to improved lithium fluorophosphates.

The preparation of $LiPF_6$ is well known. It can be prepared by the action of bromine trifluoride on LiF and an excess of $P_2O_5$, but the product always contains LiF. When prepared by the action of $PF_5$ on LiF in anhydrous HF typical purities are 90–95% $LiPF_6$. Thus, conventional methods produce only impure $LiPF_6$. Further, the latter method requires the use of hazardous HF as a solvent and thus is not easily adaptable to commercial use. Further, the product may contain $LiHF_2$ as an impurity. This contains protons which are very detrimental for some uses such as for anhydrous batteries and the like. The purification is complicated due to the hydroscopicity and limited thermal stability of $LiPF_6$. Dissociation to $PF_5$ and LiF begins to take place at about 20° C., making purification and even removal of solvents difficult. Certain industrial applications such as in the electric current producing cell of U.S. Pat. 3,415,687, require $LiPF_6$ of highest purity, above about 99%, for best performance. However, conventional methods, as pointed out above, produce at best material of up to 95% $LiPF_6$. This material is not entirely suitable because the impurities can interfere with storage stability and solubility of the material.

SUMMARY OF THE INVENTION

The invention provides tetraacetonitrilohexafluorophosphate, $Li(CH_3CN)_4PF_6$, and improved lithium hexafluorophosphate, $LiPF_6$, derived therefrom as well as methods for the preparation of these new compositions.

$Li(CH_3CN)_4PF_6$ may be prepared in accordance with the invention by the action of excess $CH_3CN$ on LiF and $PF_5$ or by the action of excess $CH_3CN$ on even impure $LiPF_6$ at a temperature of about −40° C. to about 80° C., preferably 0–80° C. for $LiPF_6$ starting material and −10 to 20° C. of LiF and $PF_5$ starting material. The tetraacetonitrilolithiumhexafluorophosphate can be prepared by several alternate routes beginning with the basic raw materials acetonitrile, phosphorus pentafluoride and lithium fluoride. The order of addition of these basic components is not critical to the success of the overall process, but it is strongly preferred to follow a certain order of addition for most economic and satisfactory operation of the process. Thus it is possible to combine the phosphorus pentafluoride with an excess of acetonitrile in the absence of any lithium fluoride. This, however, will cause the formation of a precipitate which is probably an adduct between phosphorus pentafluoride and acetonitrile which must then in turn be reacted in slurry form with lithium fluoride in order to cleave the adduct and form the desired compound. A better procedure is to first combine the lithium fluoride with an excess of acetonitrile since the lithium fluoride is more reactive than the acetonitrile toward the $PF_5$. Combination of lithium fluoride with excess acetonitrile, with subsequent addition of phosphorus pentafluoride, therefore, leads to a smooth and economical process. It is important, but not crucial, to the preferred process, therefore, that the reaction system always contain a stoichiometric amount or less of the phosphorus pentafluoride. The $Li(CH_3CN)_4PF_6$ can be isolated from the excess $CH_3CN$ by removal of the latter under vacuum. It can be isolated in very pure form of 99% or better by separating the solution thereof from any impurities and cooling the filtrate below about 0° C. under partial vacuum with withdrawal of $CH_3CN$ which is not chemically bound into the new compound.

Only acetonitrile acts on LiF and $PF_5$ or $LiPF_6$ to form the new compound, $Li(CH_3CN)_4PF_6$. The nearest homologue, propionitrile, as is illustrated by an example given below does not form a compound. Further, the $CH_3CN$ does not react with or dissolve LiF or other common impurities in conventionally prepared $LiPF_6$ so that the $Li(CH_3CN)_4PF_6$ can be easily separated from the impurities and used to produce pure $LiPF_6$. Therefore, the action of excess acetonitrile on LiF and $PF_5$ is unique and provides a useful new compound.

One use for $Li(CH_3CN)_4PF_6$ is the production of improved, high purity $LiPF_6$. When $Li(CH_3CN)_4PF_6$ is warmed above about 20° C. under a partial vacuum it dissociates into $LiPF_6$ and $CH_3CN$. If the warming and partial vacuum are continued until substantially all $CH_3CN$ has been evolved and separated, a $LiPF_6$ of exceptionally high purity and high surface area is obtained. $LiPF_6$ prepared by this process can be used where the highest purity $LiPF_6$ heretofore obtainable has not been entirely satisfactory, e.g. for the preparation of the electrolyte solution in organic solvents for use in anhydrous electric cells such as in U.S. Pat. 3,415,687.

Removal of the $CH_3CN$ in the solid state produces a highly surface active $LiPF_6$ which dissolves readily even in solvents in which conventionally prepared $LiPF_6$ is only slightly soluble such as propylene carbonate, methyl acetate, nitro methane and the like. The purity of the resulting $LiPF_6$ is above 99%, provided that the starting $Li(CH_3CN)_4PF_6$ is at least 99% pure and the $CH_3CN$ is completely removed.

The compound $Li(CH_3CN)_4PF_6$ is unique in that acetonitrile solutions of the compound can be heated at 80° C. for three hours without excessive decomposition whereas $LiPF_6$ decomposes at much lower temperatures of e.g. 30 to 40° C. to LiF and $PF_5$. It is pointed out, however, that the solubility of $Li(CH_3CN)_4PF_6$ in acetonitrile is strongly temperature dependent. A saturated solution contains 82 g./100 ml. at 60° C. and 11 g./100 ml. at 0° C. Excess $CH_3CN$ may be removed in any suitable manner but vacuum evaporation at −10° C. to 0° C. is preferred.

The pure crystals of $Li(CH_3CN)_4PF_6$ melt at 65 to 66° C. without decomposition. By contrast $LiPF_6$ exhibits a $PF_5$ equilibrium pressure of 60 mm. Hg at 65° C. There is no dissociation of $Li(CH_3CN)_4PF_6$ to LiF and $PF_5$ until all of the $CH_3CN$ has been removed. In other words, when $Li(CH_3CN)_4PF_6$ is heated under partial vacuum all of the $CH_3CN$ is evolved before there is any decomposition of the $LiPF_6$.

Another use for $Li(CH_3CN)_4PF_6$ is as a polymerization catalyst for cyclic ethers or unsaturated hydrocarbons.

The invention is further illustrated by the following examples.

EXAMPLE I

The preparation of Li(CH₃CN)₄PF₆

Phosphorus pentafluoride was introduced into a slurry of 23 g. of LiF in 1 liter of anhydrous, freshly distilled acetonitrile while cooling to 0° C. and stirring vigorously.

After approximately 125 g. of PF₅ had been absorbed the gas introduction was terminated and the slurry was warmed to 60 to 70° C., filtered and cooled to 0° C. The precipitate was collected by filtration and dried in vacuum at 0 to 5° C. A total of 82 g. of Li(CH₃CN)₄PF₆, melting at 65 to 75° C., was obtained.

X-ray diffraction pattern was as follows:

| A. | Intensity, percent | A. | Intensity, percent |
|---|---|---|---|
| 8.7 | 25 | 3.56 | 75 |
| 6.3 | 100 | 3.02 | 10 |
| 5.1 | 90 | 2.98 | 12 |
| 4.65 | 15 | 2.96 | 11 |
| 4.33 | 30 | 2.86 | 11 |
| 4.12 | 35 | 2.78 | 10 |
| 4.02 | 20 | 2.62 | 5 |
| 3.72 | 70 | 2.54 | 5 |
| 3.63 | 100 | 2.48 | 5 |

EXAMPLE II

Stability test of Li(CH₃CN)₄PF₆ in acetonitrile

A solution of 80.0 g. Li(CH₃CN)₄PF₆ in 100 ml. anhydrous acetonitrile (freshly distilled from calcium hydride) was heated to 80° C. for three hours while excluding moisture by a stream of dry nitrogen. After cooling to ambient temperature and storage overnight, the precipitated crystals were removed by filtration. Concentration of the filtrate to 30 ml. and cooling to 0° produced a second crop of crystals. The combined precipitates were dried in vacuum at 0° yielding 73.5 g. of Li(CH₃CN)₄PF₆ (92% recovery).

EXAMPLE III

Propionitrile as solvent for LiPF₆

Lithium hexafluorophosphate (20.0 g.), prepared from lithium fluoride and phosphorus pentafluoride, was dissolved in 100 ml. dry acetonitrile at 55° C. The solution was stored at ambient temperature for several days and was then slowly concentrated in partial vacuum. No precipitate formed. An oil separated on cooling to 0° C. which resisted all attempts to induce crystallization by customary methods.

EXAMPLE IV

Li(CH₃CN)₄PF₆ as polymerization catalyst

An anhydrous solution of 50.0 g. of trioxane (freshly distilled) in 50.0 g. of acetonitrile was warmed to 70° C. while excluding moisture by a stream of dry nitrogen. To the stirred solution was added 0.5 of Li(CH₃CN)₄PF₆ dissolved in 5 ml. anhydrous acetonitrile. The polymerization of trioxane began within minutes as indicated by the precipitation of insoluble material. After three hours the mixture was cooled to room temperature, filtered and the insoluble portion was washed several times with acetone and then with water. Drying in vacuum at 50° C. yielded 30.5 g. polyoxymethylene polymer (61%).

EXAMPLE V

The preparation of lithium hexafluorophosphate

A 2-liter stirred autoclave was charged with 82.0 g. lithium fluoride, evacuated and cooled to −78° C. One liter of anhydrous hydrogen fluoride was condensed into the reactor and the mixture was warmed to 25° C. while stirring. After one hour the autoclave was pressurized with phosphorus pentafluoride until a constant pressure of 50 p.s.i. was reached. Excess phosphorus pentafluoride and the solvent was removed the following day by condensation into an evacuated cylinder cooled with liquid nitrogen. The autoclave contained 383 g. of crude lithium hexafluorophosphate (92.1% LiPF₆).

Another possibility is to react LiF with PF₅ in the absence of HF, but the reaction takes longer and the product is even more impure. It can, however, be reacted with CH₃CN to prepare the Li(CH₃CN)₄PF₆.

Crude lithium hexafluorophosphate (620 g.) prepared as above was added to one liter of anhydrous acetonitrile while stirring. The temperature of the slurry rose to 55° C., and was further increased to 70° C. by external heating. Insoluble material was removed by filtration. The brown solution was decolorized by activated carbon. On cooling to room temperature, large colorless needles precipitated and were collected. A second crop was obtained by cooling the filtrate to −10° C.

Drying of the combined precipitates in vacuum at 0 to 5° C. produced 1130 g. of Li(CH₃CN)₄PF₆. The compound melted at 65 to 75° C. Complete removal of the acetonitrile was achieved by warming to 30° C. in an evacuated system with an attached cold trap maintained at −78° C. Yield: 551 g. of 99.7% LiPF₆.

It is to be understood that the foregoing working examples are given for the purpose of illustration and that any other processes, order of addition, temperature or the like set forth above may be used, provided that the teachings of this disclosure are followed.

I claim:
1. Tetraacetonitrilolithiumhexafluorophosphate.
2. A method for the preparation of tetraacetonitrilolithiumhexafluorophosphate which comprises reacting excess acetonitrile with lithium fluoride and phosphorus pentafluoride at a temperature of about −40° C. to about 80° C.
3. The method of claim 2 wherein said lithium fluoride and phosphorus pentafluoride are prereacted to form lithiumhexafluorophosphate.
4. The method of claim 2 wherein said reaction temperature is in the range of from about 0 to about 80° C. and tetraacetonitrilolithiumhexafluorophosphate is separated from impurities and then cooled below about 0° C. under partial vacuum to remove the excess acetonitrile.

References Cited

UNITED STATES PATENTS 3,475,479  10/1969  Vullo  260—465.8

JOSEPH P. BRUST, Primary Examiner

U.S. Cl. X.R.

23—50, 89